United States Patent
Simensen et al.

[11] Patent Number: 6,121,441
[45] Date of Patent: Sep. 19, 2000

[54] PROCEDURE FOR PRODUCING URONIC ACID BLOCKS FROM ALGINATE

[75] Inventors: Merethe Kamfjord Simensen, Tønsberg; Olav Smidsrød, Trondheim; Kurt Draget, Ranheim; Finn Hjelland, Vormedal, all of Norway

[73] Assignee: FMC Biopolymer AS, Drammen, Norway

[21] Appl. No.: 09/074,585

[22] Filed: May 8, 1998

[30] Foreign Application Priority Data

May 9, 1997 [NO] Norway ................................. 972136

[51] Int. Cl.[7] ............................. C08B 37/00; C08B 37/04; C07H 1/00
[52] U.S. Cl. ............................. 536/124; 536/3; 536/127
[58] Field of Search ............................. 536/3, 124, 127

[56] References Cited

U.S. PATENT DOCUMENTS 5,169,840  12/1992  Otterlei et al. ........................ 514/55
5,503,771  4/1996   Staley et al. ........................ 252/311

FOREIGN PATENT DOCUMENTS 962936      12/1996  Norway.
2063754-C1  7/1996   Russian Federation.
WO98/02488  7/1997   WIPO.

OTHER PUBLICATIONS

Smidsrod et al., 'Chemistry and Physical Properties of Alginates', Carbohydrates In Europe, May 1996, vol. 14, pp. 6–13.

Acta Chemica Scandinavica 20 (1966) 183–190—A Study of the Constitution of Alginic Acid by Partial Acid Hydrolysis, Haug, Larsen & Smidsrød.

Acta Chemica Scandinavica 21 (1967) 691–704—Studies on the Sequence of Uronic Acid Residues in Alginic Acid, Haug, Larsen & Smidsrød.

Primary Examiner—Howard C. Lee
Assistant Examiner—Everett White
Attorney, Agent, or Firm—Wenderoth, Lind & Ponack, LLP

[57] ABSTRACT

A new procedure for producing block fractions from alginate, mainly G block alginate or M block alginate, by selective fractionated release of the M block fraction from the solid phase. MG block fractions can also be isolated.

18 Claims, 2 Drawing Sheets

● FG for precipitate
○ FG for supernatant
△ % insoluble material ("G-block") or hydrolysis

PROCEDURE FOR PRODUCING URONIC ACID BLOCKS FROM ALGINATE

The present invention concerns a new procedure for producing block fractions from alginate, mainly G block alginate and/or M block alginate.

BACKGROUND OF THE INVENTION

Alginates are isolated from marine brown algae. Alginate is also produced in soil bacteria such as *Azotobacter vinelandii* and *Azotobacter crococcum* and several different Pseudomonas bacteria. However, commercially available alginate is generally derived from brown algae.

Alginates are used in foodstuffs and in pharmaceutical, dental, cosmetic and other industrial products. The most common industrial applications are based on their hydrocolloidal and polyelectrolytic nature, which forms the basis for the gel-forming, thickening, stabilising, swelling and viscosity-providing properties.

Alginates are salts of alginic acid, a linear heteropolysaccharide consisting of (1→4) linked β-D-mannuronic acid, designated as M, and α-L-guluronic acid, designated as G.

These two uronic acids have the following formulae:

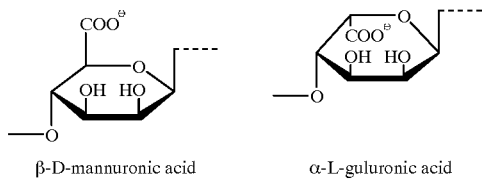

β-D-mannuronic acid         α-L-guluronic acid

The polymers exist as homopolymer sequences of mannuronic acid, called M blocks, homopolymer sequences of guluronic acid, called G blocks, and mixed sequences of mannuronic and guluronic acid units, so-called MG blocks or alternating blocks.

To illustrate the structure of the alginates, the following is a schematic representation of a conceivable block structure:

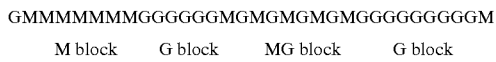

Usually, alginate contains all three types of blocks and a block mostly consists of three to thirty monomer units. The distribution of the blocks depends on the type of algae from which the alginate is isolated as well as on the age and part of the plant, for example alginate from the stalk may have a different sequence and block composition to alginate isolated from the leaves. The time of year at which the algae are harvested also affects the block composition and sequence. According to the knowledge we have today, the highest G content can be found in the stalks of old *L. hyperborea*. The leaf of the same species has a somewhat lower G content and shorter G blocks, but the content is still higher than most other species. Commercially available alginates usually have a G content of 25% –70%.

Sources which have a high content of M blocks are, for example, species of the brown algae genera *Durvillea, Lessonia* and *Ascophyllum*.

RELATED PRIOR ART

The production of block fractions of alginate, G blocks, M blocks and MG blocks, is described in, among others: [A. Haug and O. Smidsrød (1966) "A study of the constitution of alginic acid by partial hydrolysis" *Acta Chem. Scand.* 20, 183–190] and [A. Haug, B. Larsen and O. Smidsrød (1967) "Studies of the sequence of uronic acid residues in alginic acid" *Acta Chem. Scand.* 21, 691–704].

The procedure described in these two articles comprises the following stages:

a) alginic acid is hydrolysed at 100° C. for 3–5 hours, which results in the alginate being split into blocks of guluronic acid (G block), mannuronic acid (M block) and alternating blocks (MG block). The MG blocks dissolve. The optimal length of the MG blocks is achieved by interrupting the hydrolysis after 10–30 minutes;

b) filtration before removal of dissolved MG blocks from undissolved G and M blocks;

c) pH adjustment with lye to pH 7, whereby the undissolved fraction which contains G block and M block fractions of alginate dissolves;

d) pH adjustment with acid to pH 2.4–2.8 to precipitate out the G block fractions;

e) filtration; the M block is still dissolved;

f) pH adjustment with acid to pH 1.3 or lower to precipitate out the M block fractions.

U.S. Pat. No. 5,503,771 describes a gelling suspension which contains colloidal metal or ceramic particles, water and an effective quantity of a biopolymer dispersant as well as a biopolymer gelling agent which has a molar weight of a minimum 50,000 g/mol and which can be transferred from a non-gelled state to a gelled state. The biopolymer dispersant may be selected from, among others, the group consisting of a polymannuronic acid-rich hydrolysis product of alginate, a polyguluronic acid–rich hydrolysis product of an alginate and a number of other polysaccharides which have gel–forming properties as well as mixtures of these polysaccharides. The procedure for producing a polymannuronic acid-rich hydrolysis product of alginate, which thus corresponds to an M block alginate, or a polyguluronic acid-rich hydrolysis product of alginate, i.e. a G block alginate, is the same as that described in the two above-mentioned articles.

INDUSTRIAL APPLICATION

Recently, several new applications have been found for the various polyuronic acid fractions, in particular G block and M block fractions from alginate.

G block fractions can be used as, among other things, modulators for rheology in gelling alginate systems. This invention is described in Norwegian patent application 962936, which was submitted on Jul. 12, 1996.

Furthermore, G blocks or M blocks can be used as described in the above-mentioned U.S. patent: the biopolymer dispersant, which can be G block or M block fractions from alginate, is intended to disperse the colloidal particles in water and thus contribute to the formation of a non-agglomerated suspension which has a low, pourable viscosity so that the final suspension can be transferred to a mould before gelling is initiated, after which the product is pyrolysed and sintered.

The main objective is to obtain a dispersed product in which gel formation ensures that the dispersed particles are kept in place.

Other applications for G blocks are, for example, as low-viscous flocculants which can be used for the removal of toxic metal ions such as, for example, lead, strontium and barium.

Alginates which are rich in M blocks, so-called poly-M alginates, have been shown to demonstrate a stimulating effect on certain cells in the immune defence mechanism so that protection against, for example, infections and radiation damage, can be obtained. Such M block alginates can thus be used in connection with the production of a pharmaceutical product. This invention is described in EP-B2-506326/U.S. Pat. No. 5,169,840. It is conceivable that the M blocks produced in accordance with the present invention can be polymerised either by traditional organo-chemical methods or biotechnological methods.

There is reason to believe that these different uronic acid blocks may have valuable properties in connection with the production of new products, particularly in the pharmaceutical field.

DEFINITION OF THE PROBLEM SOLVED BY THE PRESENT INVENTION

However, the known procedure suffers from a disadvantage which makes it unsuitable for the industrial production of large quantities of the different uronic acid blocks.

The problem is the large volumes with which it is necessary to work in stage c) when both G block and M block fractions are to be dissolved. This is achieved by a pH adjustment from low to neutral pH. To avoid the solution having too high a viscosity and thus deficient precipitation of the G block fraction in stage d), 0.25%–1% concentrations of alginate are used. This thus results in the increase in volume being almost 100–400 times in relation to the original alginic acid.

In stage d), precipitation of the G blocks from the solution, it is necessary to work with "thin" acid to avoid M blocks also being precipitated out. This results in a further increase in dilution. This large volume of aqueous solution must subsequently be maintained in the remaining stages, which makes this procedure cumbersome in practice and impossible to implement on an industrial scale.

SUMMARY OF THE INVENTION

In accordance with the present invention, it has now surprisingly been found that it is possible to produce block fractions of alginate, in particular G block and/or M block fractions, by means of a procedure in which the above problem is solved. As a stage in this procedure, the MG block fraction can also be isolated and optimised, as mentioned earlier.

DETAILED DESCRIPTION OF THE INVENTION

Figure 1:
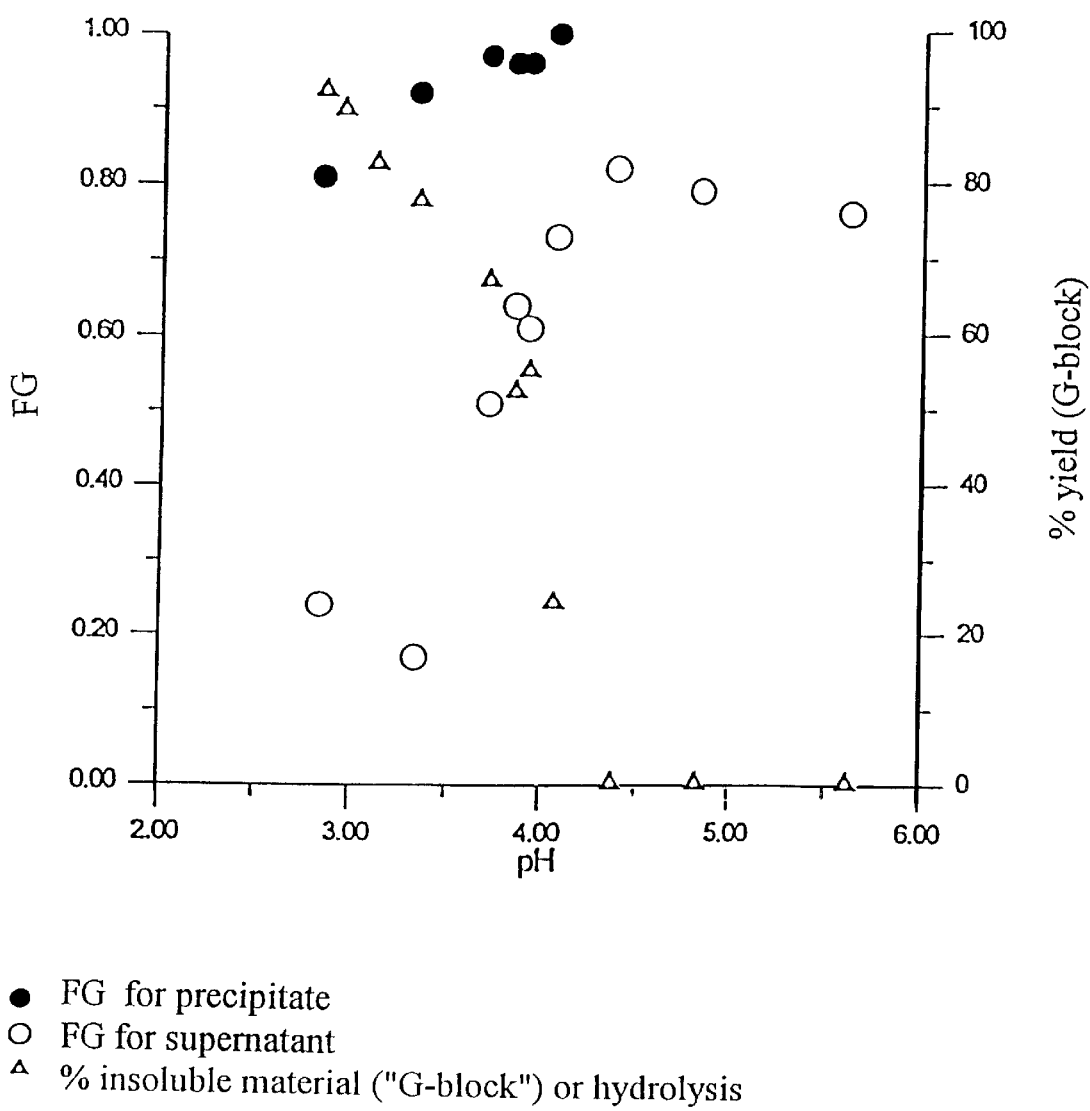
FIG. 1 shows the pH dependency for the fraction of guluronic acid.

The procedure for producing uronic acid fractions from alginate in accordance with the present invention comprises the following stages:
a) hydrolysing alginic acid with acid to form fractions of G blocks, M blocks and MG blocks, whereby the fraction which contains MG blocks dissolves and a fraction which contains G blocks and M blocks remains undissolved; and
b) suspending the undissolved fraction in water and adjusting the pH with lye to pH 2.8–4.0, most preferably pH 3.0–3.5, whereby the fraction which contains M blocks dissolves while a fraction which contains G blocks remains undissolved.

It will be preferable to implement one or more of the following additional stages in the procedure:
(i) separating an undissolved fraction from a dissolved fraction after stage a) and/or stage b) by filtration, centrifuging or another suitable method;
(ii) isolating a G block fraction in acid form or salt form after stage b);
(iii) isolating a fraction which contains M blocks
 (i) by adjusting the pH with acid to pH 1.4–0.5 to precipitate out the M block fraction
 (ii) by using membrane technology followed by a stage for removing water and drying the M block fraction or
 (iii) by precipitating out the M block fraction with alcohol.
(iv) adjusting the pH to 3.5–4.0 in stage b) to produce a fraction of G blocks with a high purity;
(v) adjusting the pH to 2.8–3.0 in stage b) to produce a fraction of G blocks with a high yield;
(vi) adjusting the pH to 3.0–3.5, in particular pH 3.3, in stage b) to produce a fraction of G blocks with a relatively high yield and purity;
(vii) adjusting the pH to 1.3 in stage i) to precipitate out a fraction of M blocks;
(viii) using an alginic acid with a high M content to produce M blocks with a high purity and/or high yield;
(ix) using an alginic acid with a high G content to produce G blocks with a high purity and/or high yield;
(x) hydrolysing the alginic acid with acid in stage a) at 40–100° C. and with a 0.05–5M acid; and/or
(xi) interrupting the hydrolysis in stage a) after 10–30 minutes to isolate MG blocks and, after having removed these blocks, continuing the hydrolysis until the M block fraction has mainly dissolved.

Usually, the procedure in accordance with the present invention will be carried out by implementing the following stages:
a) hydrolysing alginic acid at 40–100° C. with acid which has a concentration in the range 0.05–5M so that a fraction containing MG blocks dissolves;
b) separating a fraction which contains dissolved MG blocks from an undissolved fraction which contains G blocks and M blocks by filtration, centrifuging or another suitable method;
c) suspending the undissolved fraction in water and adjusting the pH with lye to pH 2.8–4.0, most preferably pH 3.0–3.5, whereby the fraction which contains M blocks dissolves;
d) separating, by filtration, centrifuging or another suitable method, the undissolved fraction which contains G blocks from a dissolved fraction which contains M blocks; and, possibly,
e) producing in pure form a fraction which contains M blocks
 (i) by adjusting the pH with acid to pH 1.4–0.5 to precipitate out the M block fraction or
 (ii) by using membrane technology followed by a stage for removing water and drying the M block fraction or
 (iii) by precipitating out the M block fraction with alcohol.

When the M block fraction is precipitated out, it will be isolated in subsequent stages, by filtration, centrifuging, washing and drying or similar methods, from the remaining acid fraction or alcohol fraction, as is very familiar to those skilled in the art. The membrane technology which may be used in stage e) (ii) may, for example, be dialysis or other membrane filtration techniques. The stage for removal of water and drying the M block fraction may, for example, be freeze-drying or spray-drying. In stage e) (iii), any alcohol which can be removed effectively, for example isopropanol, may be used.

The procedure according to the prior art represents a fractionated precipitation of M blocks and G blocks while the procedure according to the present invention, on the other hand, represents a fractionated release. This results in the major advantage of the procedure in accordance with the present invention as the volume required is reduced to a fraction so that the process can be implemented on an industrial scale. Furthermore, another advantage is considerably reduced consumption of chemicals by means of the pH adjustments and thus greatly reduced costs.

Figure 2:
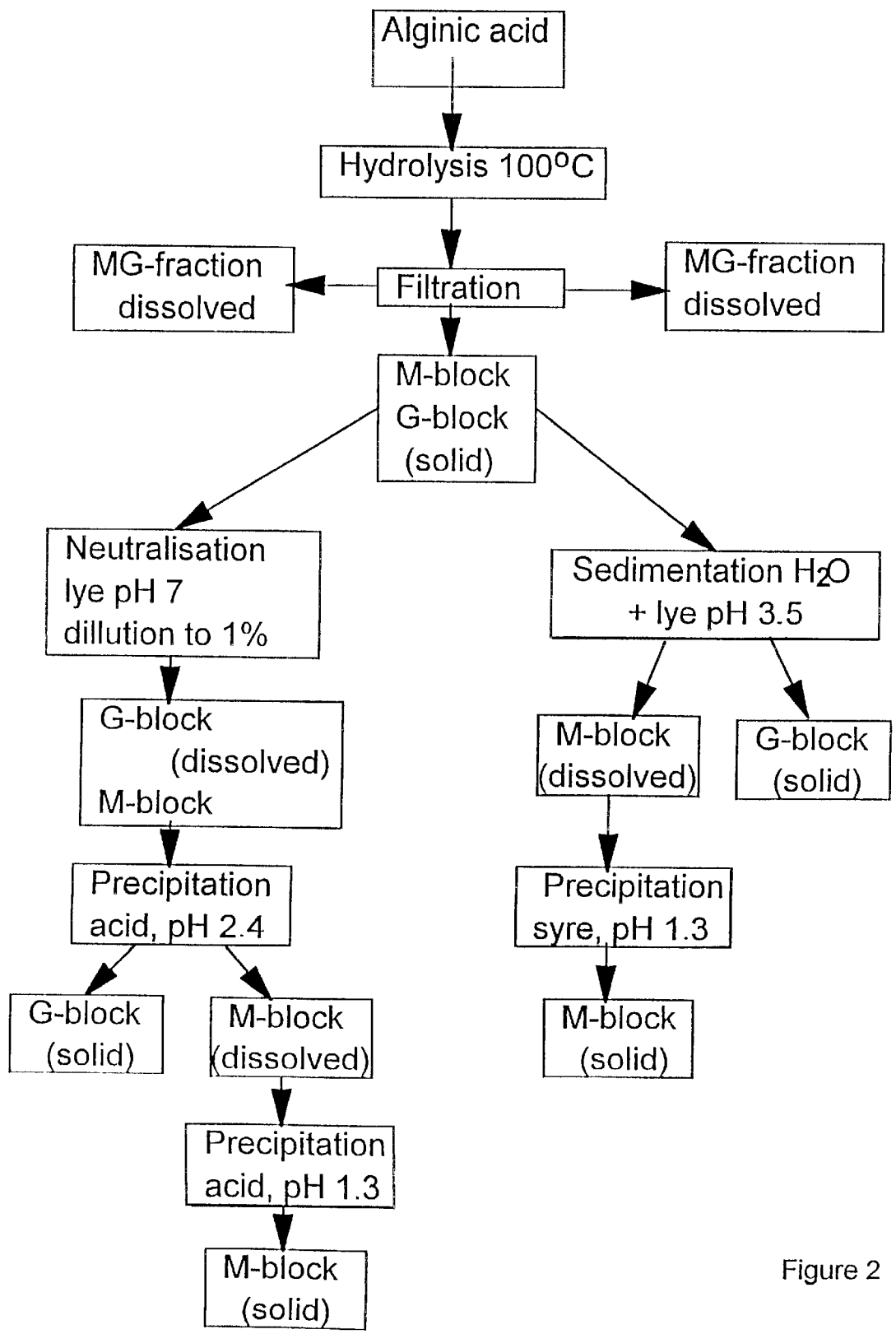
FIG. 2 shows a comparison of the process of the present invention compared to a prior art process.

FIG. 2 shows a schematic representation of the two procedures.

The main difference between the present invention and the procedure in accordance with the prior art is thus that, after having removed the dissolved fraction which contains alternating MG blocks, the entire undissolved fraction which contains both M blocks and G blocks is not dissolved. Instead of complete neutralisation, a pH value in range 2.8–4.0 is selected, which selectively releases the M block fraction while the G block fraction remains undissolved. The volume required in this connection will, therefore, be less for the following reasons: only the fraction which contains M blocks is to be dissolved so that less solid is to be dissolved. Moreover, the dissolved fraction contains only one type of block, namely M blocks, and not a mixture, which avoids the necessity of working in such heavily diluted solutions.

As mentioned earlier, in accordance with the prior art, 0.25–1% alginate solutions are used in stage c), which means an increase in volume in the range of 100–400 times. However, in accordance with the present invention, an increase in volume of 10–20 times is used in this stage. The necessary aqueous volume has been reduced from 100–400 times to 10–20 times. This means that at least 10 times less volume is used over several stages when the new method is compared with the old.

The greatly reduced working volume is the decisive advantage of the present invention because, as mentioned earlier, it makes the process industrially feasible.

Another major advantage of the procedure in accordance with the present invention compared with the prior art is that the consumption of chemicals is considerably less, thus greatly reducing costs. This is because the consumption of lye required for the pH adjustment from a strong acid (pH 1) to a neutral (pH 7) solution in accordance with the prior art is reduced by half in the procedure in accordance with the present invention as the pH adjustment which is made goes from a strong acid (pH 1) to pH 3.5, i.e. only a "half-way" neutralisation of the carboxylic acid groups of the alginate blocks.

Accordingly, the consumption of acid is reduced to 10% of the consumption of acid required in accordance with the prior art when the procedure in accordance with the present invention is used to precipitate out the M block fraction. If other techniques are used to produce M blocks in pure form, the use of acid can be eliminated altogether. Table 3 shows an overview of the relative volumes and consumption of chemicals in the procedure in accordance with the present invention relative to the known procedure.

It is very surprising that it is possible to carry out such a selective fractionated release of M blocks from G blocks and still achieve a high degree of purity for the G block fraction without having to carry out separate dissolution and precipitation of this fraction.

It is actually possible to isolate G block fractions with a purity of 99% using the procedure in accordance with the present invention. There is, of course, a correlation between the purity and yield which can be obtained in connection with the pH adjustment in stage c).

Reference is made to Table 1, which shows
1) the content of guluronate in the precipitate ($F_G$ precipitate),
2) the content of guluronate in the suspension ($F_G$ solution),
3) the yield of G block (% yield) calculated in % of the precipitate after hydrolysis depending on the pH value adjusted in stage c). During the hydrolysis stage, approximately 50% of the weighed alginate is lost. The yield calculated is based on the precipitate which is isolated after filtration in stage a).

To achieve a high purity ($F_G$ precipitate=0.99), the pH value must be adjusted to 4.0–4.1 in stage c). However, the yield is also greatly reduced here (24.4%).

If it is not equally decisive for the end product to have a high purity, a yield of over 90% can be achieved by adjusting the pH to 2.8 in stage c).

Usually, it will be expedient to select a compromise value for the purity and yield such as pH 3.3, at which it is possible to produce products with a purity of over 90% and a yield of approximately 80%.

The acids which can be used in the procedure in accordance with the present invention will be any acid which does not have oxidising properties, for example strong acids like hydrochloric acid and sulphuric acid or weak acids like oxalic acid and acetic acid. The hydrolysis stage will be carried out as is customary for those skilled in the art. Usually, acid concentrations in the range 0.05–5M will be selected, more preferably 0.1–1M. A suitable example is 0.3M hydrochloric acid.

It will usually be expedient to use NaOH as the lye, but it is possible otherwise to use any compound which will have a neutralising effect on the acid used in the earlier stages in the procedure so that the pH adjustments mentioned can be made. A suitable concentration range will be 1–10M NaOH.

Membrane technology methods may, for example, comprise dialysis or other membrane filtration methods. The important aspect here is to reduce the high content of salts in the solution. Methods for removing water and subsequently drying the product required will, for example, be freeze-drying or spray-drying, possibly in connection with precipitation and washing with alcohol before drying.

In this connection, the expression "G block fraction of alginate" or "M block fraction of alginate" is intended to cover low-molecular alginate or alginic acid which has a high content of guluronic acid and mannuronic acid respectively. Any polysaccharide or polysaccharide fragment which contains at least two G units in the block is covered by the expression "G block fractions" in accordance with the present invention with the same applying to M block fractions. However, it is preferable to produce polysaccharide fractions which have a mean molar weight of 1000–100,000 g/mol. It is more preferable for the "G block fractions" to be produced within the molar weight range 1000–50,000 g/mol and it is most preferable to work within the molar weight range 2000–40,000 g/mol.

The expression fragment is intended to cover small parts of whole alginate chains, in particular the parts which share the common feature that they either consist mainly of guluronic acid monomers, so-called G blocks, or mannuronic acid monomers, so-called M blocks, or alternating guluronic acid and mannuronic acid, so-called MG blocks.

As the starting material for the procedure in accordance with the present invention, it is possible to use any material which contains alginic acid such as algae, either as leaf, stalk or fastening organ. Thus it is not necessary to isolate the alginic acid before it is used in the procedure in accordance with the present invention.

It is also possible to use any alginate as raw material for the procedure, whereby the first stage a) will produce a transfer to alginic acid without it being necessary to isolate it. However, in certain cases it may be desirable to isolate the alginic acid before proceeding with the subsequent process stages. In most cases, the simplest course of action will be to use commercially available alginate/alginic acid as the raw material in connection with the present invention.

In the present invention, the expression "alginic acid" is used to describe all starting materials containing alginic acid or alginate such as algae or alginic acid and alginate in more or less pure form.

Depending on the intended application, an alginic acid with a high or low G block content or M block content or possibly MG content will be selected so as to achieve a maximum yield of the end product, whether G block fraction, M block fraction or MG fraction.

The present invention is otherwise described further in the attached claims.

EXAMPLE MATERIAL

In the following, the present invention will be described and shown in examples in further detail using examples and the accompanying figures and tables.

The following abbreviations are used in the figures and tables:

"% yield" which is calculated on the basis of the undissolved fraction after stage b) (acid hydrolysis). Approximately 50% of the weighed alginic acid/alginate is lost in this acid hydrolysis stage.

"$F_G$" which stands for Fraction of guluronic acid units in isolated material and represents a measure of the achieved purity of G. When $F_G=1$, the fraction has 100% G blocks. $F_M$ will be $1-F_G$. This value is determined on the basis of the NMR spectrum of the isolated fraction.

"$F_M$" which stands for Fraction of mannuronic acid units in isolated material and represents a measure of the achieved purity of M. When $F_M=1$, the fraction has 100% M blocks. $F_G$ will be $1-F_M$. This value is determined on the basis of the NMR spectrum of the isolated fraction.

"$DP_n$" The mean degree of polymerisation, i.e. a measure of how many monomers each block contains on average.

Example 1

Production of G Blocks in Accordance With the Present Invention

Protanal™ LFR 5/60, a high G alginate (65% G units), marketed by Pronova Biopolymer a.s in Drammen, Norway, was selected as the raw material for the production. The procedure was performed as listed below:

1. 100 ml 0.3M HCl was added to 1.0 g alginate and agitated overnight.
2. The acid was decanted off and new 50 ml 0.3M HCl was added.
3. Hydrolysis in a water bath (100° C.) for 5 hours.
4. The acid was decanted off and the precipitate was washed with 50 ml ion-free water. The water was decanted off and new water added (50 ml).
5. The suspension was subsequently adjusted with NaOH to different final pH values (3.8–5.3).
6. The suspension was placed on an agitation machine overnight and then centrifuged.
7. New water was added to the precipitate and the pH adjusted to 6.5–7.0.
8. The alginate in both the supernatant (6.) and the precipitate (7.) was analysed for quantity (FS) and chemical composition (NMR).

A description of the FS analysis method for determining the total quantity of carbohydrate can be found in [M. Dubois et al., Analytical Chemistry, Vol. 28, No. 3, pp. 350–356 (March 1956)].

TABLE 1

The content of guluronate in the precipitate and suspension after hydrolysis, washing and pH adjustment.
The table also shows the yield of "G block" in per cent of precipitate isolated after hydrolysis and before pH adjustment.
I = Insoluble; S = Soluble.

| pH | Fraction | $F_G$ | $F_M$ | % yield (of insoluble material after hydrolysis) | $DP_n$ |
|---|---|---|---|---|---|
| 2.85 | I (G block) | 0.81 | 0.19 | 92.4 | 18.7 |
|  | S (M block) | 0.24 | 0.76 | 7.6 | n.d. |
| 3.34 | I (G block) | 0.92 | 0.08 | 77.9 | 19.9 |
|  | S (M block) | 0.17 | 0.83 | 22.1 | 13.1 |
| 3.72 | I (G block) | 0.97 | 0.03 | 67.4 | 17.5 |
|  | S (M block) | 0.51 | 0.49 | 32.6 | 13.3 |
| 3.86 | I (G block) | 0.96 | 0.04 | 52.6 | 17.2 |
|  | S (M block) | 0.64 | 0.36 | 47.4 | 16.5 |
| 3.93 | I (G block) | 0.96 | 0.04 | 55.4 | 16.2 |
|  | S (M block) | 0.61 | 0.39 | 44.6 | 15.1 |
| 4.07 | I (G block) | 0.99 | 0.01 | 24.4 | 15.2 |
|  | S (M block) | 0.73 | 0.27 | 75.6 | 13.4 |
| 4.38 | I (G block) | n.d. | n.d. | 3 | n.d. |
|  | S (M block) | 0.82 | 0.18 | 97 | 15.7 |
| 4.83 | I (G block) | n.d. | n.d. | 3 | n.d. |
|  | S (M block) | 0.79 | 0.21 | 97 | 15.0 |
| 5.62 | I (G block) | n.d. | n.d. | 3 | n.d. |
|  | S (M block) | 0.76 | 0.24 | 97 | 15.9 | n.d. means "not determined".

It can be seen that the yield and purity obtained will beg pH-dependent.

The maximum purity is obtained at pH 4.07 where $F_G$ (the precipitate) is 0.99. The yield, on the other hand, is low, only 24.4%.

The maximum yield is obtained by adjusting the pH in stage c) to 2.85, although the purity is not correspondingly high here. $F_G$ (the precipitate) is 0.81.

The reason for this is that a large part of the G block fraction will be dissolved together with the M block fraction as the pH increases. This is also shown in column $F_G$ (solution) in which the figures rise as the pH value rises in the range 2.85 to 4.38.

FIG. 1 shows the pH-dependency for $F_G$ of the precipitate, i.e. the insoluble fraction from stage d) after the pH adjustment in stage c). Furthermore, the pH-dependency of the yield of G block isolated in stage d) is also shown. It can be seen that the undissolved fraction disappears completely at pH values over 4.

At the same time, the $F_G$ values of the solution show that the G blocks dissolve increasingly after pH 3.5.

Example 2

Productions of Fractions of G Blocks and M Blocks in Accordance With the Prior Art (Smidsrød, Haug et al.)

The same alginate as in example 1, i.e. a high G alginate, LFR 5/60, was selected as the raw material for the production of G blocks. M blocks were also produced from this starting material.

An alginate from *Macrocystis pyrifera,* a high M alginate (60% M units), marketed by The NutraSweet Kelco Company, was selected for the production of M blocks. G blocks were also produced from this starting material.

The production was implemented as follows, based on the publications by Smidsrød and Haug mentioned earlier in this description:

1. 5.0 g alginate was dispersed in 500 ml 0.3M HCl and placed in a water bath at 100° C. for 5 hours.
2. Cooling and centrifuging. The acid hydrolysate, i.e. the supernatant after centrifuging, is removed.
3. The precipitate after centrifuging, which contains both G block and M block fractions, is neutralised with 5M NaOH to pH 7 and both of these fractions are dissolved.
4. The concentration of alginate in solution is adjusted to 1% by dilution.
5. The pH is reduced to 2.4 by titration with HCl. A strength of acid is used which produces an alginate concentration at pH 2.4 in the range 0.25–0.5%. Reference is made in this connection to the publications by Smidsrød and Haug in which this is illustrated. Centrifuging. The precipitate which contains G blocks is neutralised with 5M NaOH, dialysed and freeze-dried.
6. The pH in the supernatant from 5. is lowered to 1.3 with 1M HCl. Centrifuging. The precipitate which contains the M block fraction is neutralised with 5M NaOH, dialysed and freeze-dried.

The results are listed in Table 2, which shows the yield in % and $F_G$ and $F_M$ of the isolated fractions. Moreover, the mean degree of polymerisation, $DP_n$, is also shown.

As these results show, it is possible to produce both G block and M block fractions from different alginate qualities with the procedure in accordance with the invention and, even if 10 times more concentrated solutions are used, the result is that the yield or purity is unacceptably low. To this is added also the decisive difference that only the new procedure in accordance with the present invention is industrially feasible. Even at concentrations of 10% this is achieved for both purity and yield in the various fractions. At the same time it is thus possible to work with a 10 times greater quantity of alginate fractions (after hydrolysis), which means, in practice, that if, using the old and new methods, the intended result of 80% is achieved in both cases, with the new method 10 times more of the desired product would have been produced.

Example 3

Production of G Blocks and M Blocks in Accordance With the Present Invention but at Three Different Concentrations: 1% 5% and 10%

The same alginate as in example 1, i.e. a high G alginate, LFR 5/60, was selected as the raw material for the production of G blocks. M blocks were also produced from this starting material.

An alginate from *Macrocystis pyrifera,* a high M alginate (60% M units), marketed by The NutraSweet Kelco Company, was selected for the production of M blocks. G blocks were also produced from this starting material.

The procedure was performed as listed below:

1. 100 ml 0.3M HCl was added to 20.0 g alginate and agitated overnight.
2. The acid was decanted off and new 50 ml 0.3M HCl was added.
3. Hydrolysis in a water bath (100° C.) for 5 hours.
4. The acid was decanted off and the precipitate was washed with 50 ml ion-free free water. The water was decanted off and new water added (50 ml).
5. The suspension was subsequently adjusted with NaOH to pH 3.5 and water added to 1000 ml, 200 ml or 100 ml, which produced an alginate concentration of 1%, 5% or 10% respectively.
6. The suspension was placed on an agitation machine overnight and then centrifuged.
7. New water was added to the precipitate and the pH adjusted to 6.5–7.0.
8. The alginate in both the supernatant (6, M block) and the precipitate (7, G block) was neutralised, dialysed and freeze-dried. The fractions of G blocks and M blocks isolated from the two alginate qualities were subsequently analysed for quantity (FS) and chemical composition (NMR).

The results are listed in Table 2, which shows the yield in % and $F_G$ and $F_M$ of the isolated fractions from the Macrocystis alginate. Moreover, the mean degree of polymerisation, $DP_n$, is also shown.

TABLE 2

The chemical composition, $DP_n$ and yield of M blocks and G blocks isolated from identically hydrolysed batches of low G (*Macrocystis pyrifera*) and high G (*Laminaria hyperborea,* LFR 5/60) alginates with the new and old methods. In the new method, the effect of the release volume has also been studied.
I = Insoluble; S = Soluble.

| Series | Fraction | $F_G$ | $F_M$ | 6 % yield (of insoluble material after hydrolysis) | $DP_n$ |
| --- | --- | --- | --- | --- | --- |
| "Old" | G block | 0.88 | 0.12 | 31 | 25 |
| Macroc. | M block | 0.10 | 0.90 | 69 | 25 |
| "Old" | G block | 0.92 | 0.08 | 87 | 28 |
| LFR 5/60 | M block | 0.07 | 0.92 | 13 | 19 |
| "New" 1% | I (G block) | 0.89 | 0.11 | 7 | 23 |
| Macroc. | S (M block) | 0.15 | 0.85 | 93 | 19 |
| "New" 1% | I (G block) | 0.97 | 0.03 | 77 | 22 |
| LFR 5/60 | S (M block) | 0.23 | 0.77 | 23 | 20 |
| "New" 5% | I (G block) | 0.81 | 0.19 | 35 | 19 |
| Macroc. | S (M block) | 0.13 | 0.87 | 65 | 19 |
| "New" 5% | I (G block) | 0.92 | 0.08 | 85 | 24 |
| LFR 5/60 | S (M block) | 0.27 | 0.73 | 15 | 13 |
| "New" 10% | I (G block) | 0.79 | 0.21 | 49 | 20 |
| Macroc. | S (M block) | 0.15 | 0.85 | 51 | 18 |
| "New" 10% | I (G block) | 0.97 | 0.03 | 80 | 21 |
| LFR 5/60 | S (M block) | 0.22 | 0.78 | 20 | 15 |

These tests were implemented to compare the purity and yield which could be achieved for the two fractions depending on whether the old or new method was used.

Example 4

Overall Presentation of the Procedural Stages for the Two Procedures for the Production of G Block and M Block Fractions From Alginate 1. Common alginate is dispersed in 500 ml 0.3M HCl. In a water bath (100° C., 5 hours). The alginate concentration for the "old" method=1%, for the "new" method this can be increased to 10%.

Prior Art

2. Cooling and centrifuging. The acid hydrolysate is removed (supernatant after centrifuging), the pH is adjusted to 7 (with 5M NaOH), and it is dialysed and freeze-dried.

3. The concentration of alginate is adjusted to 1%. A higher concentration can lead to coprecipitation and poorer purity. This results in a considerable increase in volume (100× volume/dry alginic acid).

4. The pH is lowered to 2.4 by titration with HCl. The strength of the acid is adjusted so that the alginate concentration at pH 2.4 is in the range 0.25–0.5%. The volume has been increased to 200–400×. Centrifuging. Precipitate neutralised, dialysed and freeze-dried. Produces G blocks.

5. The pH in the supernatant from 4. is lowered to 1.3. Further increase in volume. Centrifuging. Precipitate neutralised, dialysed and freeze-dried. Produces M blocks.

Present Invention

2. Cooling and centrifuging. The acid hydrolysate is removed (supernatant after centrifuging), the pH is adjusted to 7 (with 5M NaOH), and it is dialysed and freeze-dried.

3. The precipitate (contains both G blocks and M blocks) is suspended in water and the pH is adjusted to, for example, 3.5 with 5M NaOH. The concentration of alginic acid is then in the range 5–10%. The volume is 10–20×volume/dry alginic acid). As mentioned earlier, this value can be varied between 2.8 and 4.5 (changes the ratio between yield and purity). pH adjustment and incubation over 24 hours.

4a. The supernatant contains M blocks. Neutralised or kept in acid form, dialysed and freeze-dried.

4b. The insoluble part is G blocks. Neutralised or kept in acid form, dialysed and freeze-dried.

Table 3 shows a schematic representation of the volume and consumption of chemicals. The consumption in accordance with the prior art has been made 1, which emphasises the heavy reduction achieved in accordance with the present invention on these items.

TABLE 3

|  | "OLD" | "NEW" |
| --- | --- | --- |
| Lye | 1 | 0.5 |
| Acid | 1 | 0.1 (0) |
| Volume | 1 | 0.1–0.025 |

If other techniques are selected for the production of M blocks in pure form (spray drying), the consumption of acid during the isolation process in the new method is removed.

Example 5

Optimal Production of Alternating (MG) Blocks With Limited Hydrolysis Time in Accordance With the Prior Art (Haug, Larsen & Smidsrød 1967)

An alginate isolated from leaves of *Laminaria hyperborea* with $F_G=0.48$ and a high content of alternating sequences ($F_{GM,MG}=0.18$) was selected as the raw material for the production of this fraction. The alginate is marketed by Pronova Biopolymer A/S.

1. 100 ml 0.3M HCl was added to 5.0 g alginate.
2. Hydrolysis in a water bath (100° C.) for 20 minutes.
3. Cooling and centrifuging.
4. The supernatant (with MG blocks) was neutralised with NaOH, dialysed and freeze-dried.

The results in Table 4 show the monomer composition, the mean degree of polymerisation ($DP_n$) and the yield in % of the isolated MG fraction.

TABLE 4

| | Production of MG blocks | | | |
| --- | --- | --- | --- | --- |
| Fract | $F_G$ | $F_M$ | % yield (of original quantity of alginate) | $DP_n$ |
| MG block | 0.41 | 0.59 | 5.1 | 24.3 |

What is claimed is:

1. A process for producing a fraction of guluronic acid (G) blocks, a fraction of mannuronic acid (M) blocks or both a fraction of G blocks and a fraction of M blocks from alginate comprising the following stages:

a) hydrolyzing an alginate with an acid so as to form an undissolved fraction containing G blocks and M blocks, and a dissolved fraction containing MG blocks, and b) suspending said undissolved fraction from stage a) in water and adjusting the pH with a compound having a neutralizing effect on said acid to a pH of 2.8–4.0 to form a dissolved fraction containing M blocks, and an undissolved fraction containing G blocks.

2. The process in accordance with claim 1, wherein said undissolved fraction is separated from said dissolved fraction after stage a), stage b) or both stage a) and stage b).

3. The process in accordance with claim 2, wherein a M block fraction is isolated from said dissolved fraction containing M blocks (i) by adjusting the pH with acid to pH 0.5–1.4 to precipitate out the M block fraction, or (ii) by using a membrane followed by a stage for removing water and drying the M block fraction, or (iii) by precipitating out the M block fraction with alcohol.

4. The process in accordance with claim 3, wherein the pH is adjusted to 1.3 in stage i) to precipitate out the M block fraction.

5. The process in accordance with claim 1, wherein a G block fraction is isolated from said undissolved fraction containing G blocks in an acid form or a salt form after stage b).

6. The process in accordance with claim 1, wherein the pH in stage b) is adjusted to 3.5–4.0.

7. The process of claim 6, wherein the fraction of G blocks has a purity of at least 99%.

8. The process in accordance with claim 1, wherein the pH in stage b) is adjusted to 2.8–3.0

9. The process of claim 8, wherein the fraction of G blocks has a yield of at least 90%.

10. The process in accordance with claim 1, wherein the pH is adjusted in stage b) to 3.0–3.5.

11. The process in accordance with claim 10, wherein the pH in stage b) is adjusted to 3.3.

12. The process of claim 10, wherein the fraction of G blocks has a purity of at least 90% and a yield of about 80%.

13. The process in accordance with claim 1, wherein the alginic acid has a high M content.

14. The process in accordance with claim 1, wherein the alginic acid has a high G content.

15. The process in accordance with claim 1, wherein the alginate is hydrolyzed in stage a) at a temperature of 40–100° C. with a 0.05–5M acid.

16. The process in accordance with claim 1, wherein the hydrolysis is interrupted in stage a) after 10–30 minutes to isolate the MG blocks and, optionally, the hydrolysis is subsequently completed until the M block fraction has substantially dissolved.

17. The process of claim 1, wherein the compound which has a neutralizing effect on said acid is lye.

18. The process of claim 1, wherein the undissolved fraction is separated from the dissolved fraction after stage a), stage b) or both stage a) and stage b) by filtration or centrifuging.

* * * * *